INVENTORS
W. FODEN AND E. TWEMLOW
BY
ATTYS.

Jan. 3, 1950     W. FODEN ET AL     2,493,532
COOLING ARRANGEMENT OF COMPRESSION IGNITION
INTERNAL-COMBUSTION ENGINES

Patented Jan. 3, 1950

2,493,532

UNITED STATES PATENT OFFICE 2,493,532

COOLING ARRANGEMENT OF COMPRESSION IGNITION INTERNAL-COMBUSTION ENGINES

William Foden and Edwin Twemlow, Sandbach, England, assignors to Fodens Limited, Sandbach, England, a British company Application February 12, 1948, Serial No. 7,886
In Great Britain November 13, 1944

Section 1, Public Law 690, August 8, 1946
Patent expires November 13, 1964

1 Claim. (Cl. 123—173)

1

This invention relates to the water cooling arrangements of the fuel injectors and valves of compression ignition engines of the type having two valves (which may be two exhaust valves or an inlet and exhaust valve) in the cylinder head, the object being to provide for a concentration of the water flow where cooling is most required and for the simplification of the water off-take arrangements upon the cylinder head.

The improved water cooling arrangement comprises a hole or port in the cylinder head immediately below each fuel injector so that the cooling water from the cylinder block rises through such hole or port and passes around the opposite sides of the fuel injector, there being a relatively constricted port leading from the space around the injector to the space between the two valves and below a horizontal partition, and ports in the latter through which the water rises to a passageway extending from end to end of the cylinder head through which pass the valve guides, there being a single water offtake at the end of the passage-way.

Figure 1:
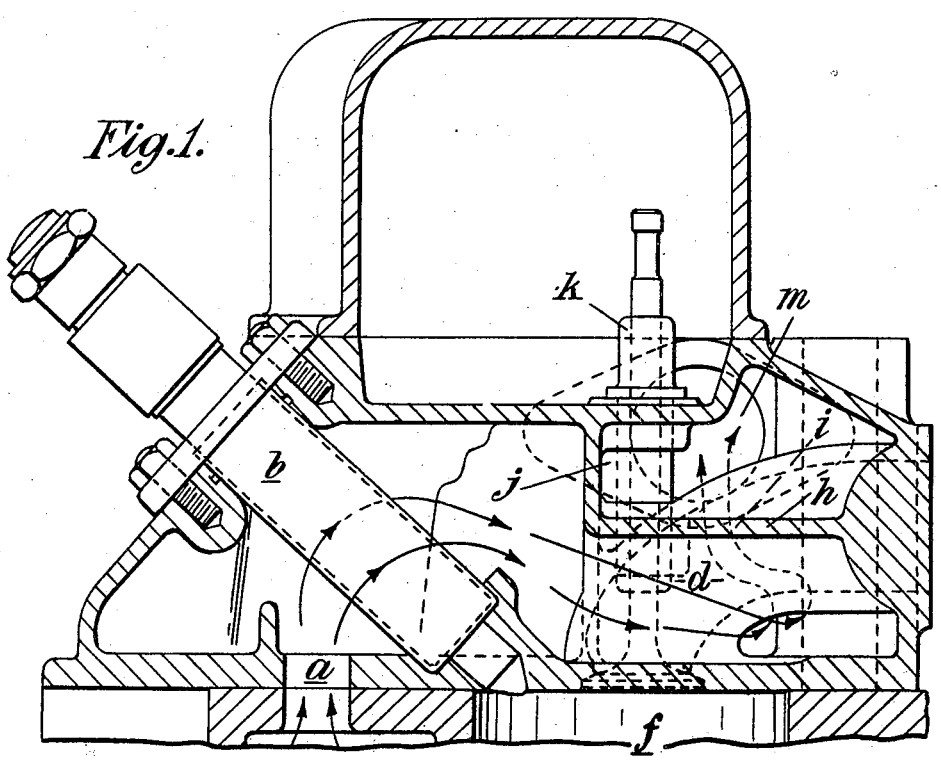
Figure 2:
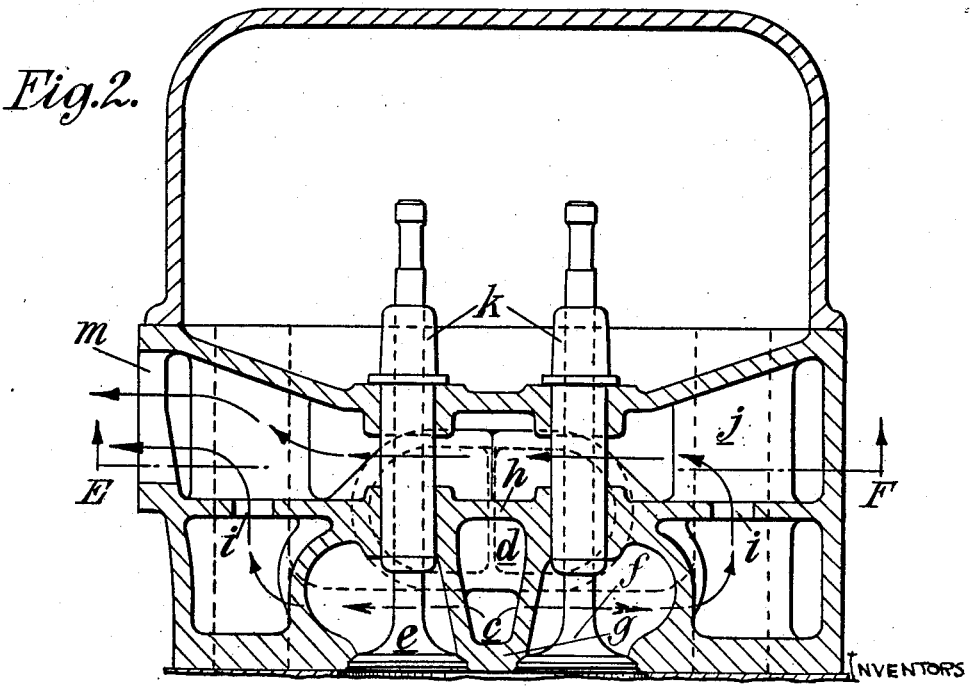
Figure 3:
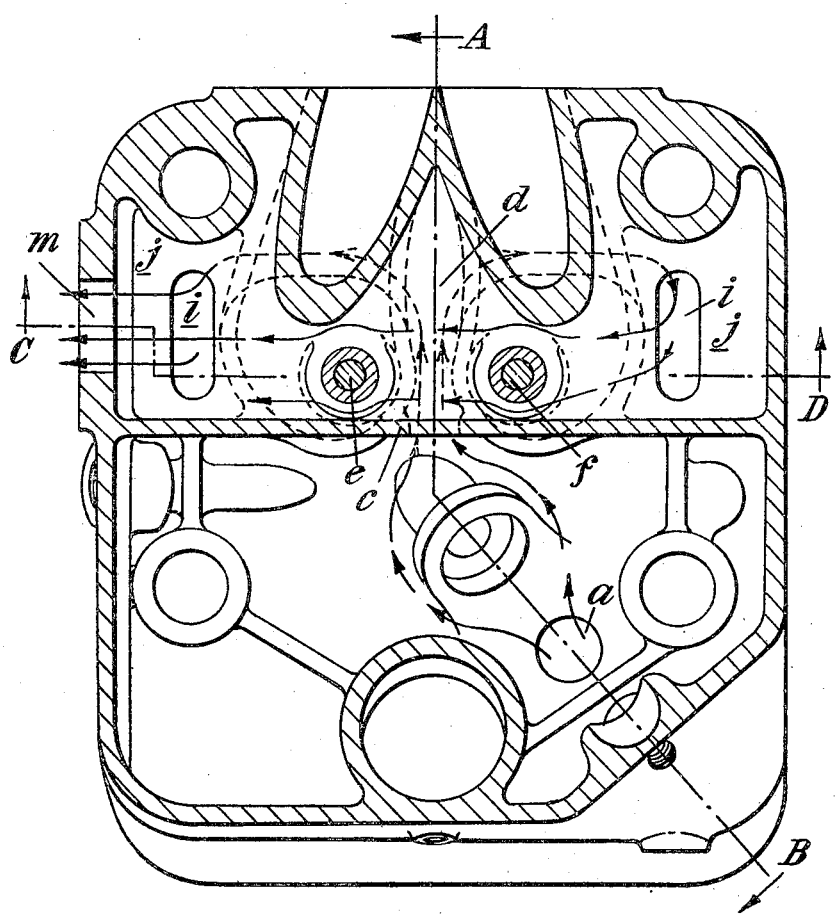

Referring to the accompanying explanatory drawings:

Figure 1 is a sectional elevation on the line A—B of Figure 3, Figure 2 a sectional elevation on the line C—D of Figure 3 and Figure 3 a sectional plan view on the line E—F of Figure 2 showing a cylinder head constructed in one convenient form in accordance with this invention.

Cooling water enters the cylinder head from the cylinder block through the port $a$ beneath the fuel injector $b$, passes around the latter at its opposite sides and across the cylinder head at an angle as shown in Figure 3. This ensure effective cooling of the injector. The water from the space around the injector $b$ is then concentrated at a relatively constricted port $c$ leading to the space $d$ between the two valves $e$ and $f$ where it ensures an effective cooling of the metal land $g$ between the two valve seats which is very important for the efficient functioning of the engine. The water proceeds from the space between the two valve seats to sweep outwards around the casings surrounding the two valves, there being a horizontal partition $h$ around and above such casings to cause the water to give effective cooling to the latter before it rises and passes through ports $i$ in said partition to a passageway $j$ extending from end to end of the cylinder head, through which pass the valve guides $k$ which are therefore cooled by the water in such passageway. There is a single water offtake $m$ at the end of the passage-way $j$. This arrangement in which there is the equivalent of a water collection manifold in the cylinder head simplifies the cooling water offtake piping.

What we claim is:

Water cooling arrangements of the fuel injectors and valves of compression ignition engines of the type having two valves in the cylinder head, comprising a hole or port in the cylinder head immediately below each fuel injector so that the cooling water from the cylinder block rises through such hole or port and passes around the opposite sides of the fuel injector, there being a relatively constricted port leading from the space around the injector to the space between the two valves and below a horizontal partition, and ports in the latter through which the water rises to a passage-way extending from end to end of the cylinder head through which pass the valve guides, there being a single water offtake at the end of the passage-way.

WILLIAM FODEN.
EDWIN TWEMLOW.

REFERENCES CITED

The following references are of record in the file of this patent:

UNITED STATES PATENTS

| Number | Name | Date |
| --- | --- | --- |
| 2,121,813 | Mitchell | June 28, 1938 |
| 2,231,173 | Starr | Feb. 11, 1941 |
| 2,236,950 | Ricardo | Apr. 11, 1941 |
| 2,450,998 | Sheppard | Oct. 12, 1948 |